United States Patent
Morita

(10) Patent No.: US 7,376,637 B2
(45) Date of Patent: May 20, 2008

(54) IMAGE TRANSMISSION APPARATUS WHICH TRANSMITS IMAGE DATA AS AN IMAGE FILE OR A PLURALITY OF IMAGE FILES

(75) Inventor: Hiroyasu Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 477 days.

(21) Appl. No.: 10/794,562

(22) Filed: Mar. 5, 2004

(65) Prior Publication Data

US 2004/0181505 A1    Sep. 16, 2004

(30) Foreign Application Priority Data

Mar. 14, 2003   (JP) ............... 2003-069809

(51) Int. Cl.
*G06F 7/00* (2006.01)

(52) U.S. Cl. .................. 707/1; 707/104.1; 707/1; 358/1.16; 358/1.17; 358/1.15

(58) Field of Classification Search ............ 707/104.1, 707/1
See application file for complete search history.

(56) References Cited

U.S. PATENT DOCUMENTS

| | | | |
|---|---|---|---|
| 6,982,811 B2 * | 1/2006 | Sato | 358/1.4 |
| 7,145,678 B2 * | 12/2006 | Simpson et al. | 358/1.15 |
| 2001/0015823 A1 * | 8/2001 | Sato | 358/1.15 |
| 2002/0030853 A1 * | 3/2002 | Kizaki et al. | 358/1.16 |
| 2002/0051195 A1 * | 5/2002 | Arakawa | 358/1.15 |
| 2002/0131074 A1 * | 9/2002 | Yamade | 358/1.15 |
| 2002/0181026 A1 * | 12/2002 | Idehara | 358/402 |
| 2004/0012813 A1 * | 1/2004 | Wu et al. | 358/1.16 |
| 2005/0280854 A1 * | 12/2005 | Sato | 358/1.9 |
| 2006/0158706 A1 * | 7/2006 | Mori et al. | 358/540 |

FOREIGN PATENT DOCUMENTS

JP    09-163064    6/1997

* cited by examiner

*Primary Examiner*—Don Wong
*Assistant Examiner*—Binh V Ho
(74) *Attorney, Agent, or Firm*—Canon U.S.A. Inc., IP Division

(57) ABSTRACT

A data transmission apparatus capable of transmitting input image data of a plurality of pages as one or more image files is disclosed. It is designated which page or pages are to be put into each image file. Such designation may be specified by a user. One or more image files are created in accordance with the designation. The created image files are transmitted, for example, using an E-mail or File Transfer Protocol.

14 Claims, 7 Drawing Sheets

IMAGE TRANSMISSION APPARATUS WHICH TRANSMITS IMAGE DATA AS AN IMAGE FILE OR A PLURALITY OF IMAGE FILES

CROSS-REFERENCES TO RELATED APPLICATIONS

This application claims the benefit of Japanese Application 2003-069809, filed Mar. 14, 2003.

BACKGROUND OF THE INVENTION

1. Field of the Invention

The present invention relates generally to a data transmission system for transmitting input image data to a designated address, and more specifically to a data transmission system for transmitting multiple pages of image data in one or more image files.

2. Description of the Related Art

In conventional data transmission systems, when transmitting an input image, such as an image obtained by reading an original using a scanner, an image received from the outside, or the like, to a designated address, it is possible to convert the image into a designated image file format using a preset image conversion function, and transmit an image after conversion. For example, when transmitting images of a plurality of pages obtained by reading an original including a plurality of pages using a scanner, an image of each page is transmitted after being converted into an image file of an appropriate file format designated by a user. At that time, if the designated file format can have a plurality of pages within one file, all pages of the original are transmitted as one file. File formats capable of having a plurality of pages in one file include, for example, the TIFF (Tag Image File Format), the PDF (Portable Document Format), and the like.

For example, Japanese Patent Application Laid-Open (Kokai) No. 9-163064 (1997) describes an approach of outputting images of a plurality of pages obtained by reading an original by converting the images into one TIFF file.

If a selected file format can have a plurality of pages in one file as described above, since images of all read pages are transmitted as one file at a single transmission operation, no problem arises if this satisfies the user's intention. However, for example, such a transmission operation cannot deal with a case in which it is intended to transmit images on respective pages to the same address as separate files at a single processing. Accordingly, when transmitting images on respective pages to the same address as individual files, the user must form a plurality of files by dividing an original with a desired unit, and repeat the operation of transmitting each of the files to the same address, resulting in a troublesome operation.

SUMMARY OF THE INVENTION

A feature of the present invention is to provide a data transmission apparatus in which the above-described problems are solved.

Another feature of the present invention is to provide a data transmission apparatus that can easily transmit image data of a plurality of pages in a form conforming to a user's intention.

Still another feature of the present invention is to provide a data transmission apparatus that can transmit image data of a plurality of pages by converting the image data into image files in a desired unit.

According to one aspect of the present invention, a data transmission apparatus includes an input unit, a first converting unit, a designating unit and a transmitting unit. The input unit is configured to obtain input image data having a plurality of pages. The first converting unit is configured to create a plurality of transmission files by converting the input image data having the plurality of pages into the plurality of transmission files. The designating unit is configured to designate which page or pages are to be put into each transmission file to be created by the first converting unit. The transmitting unit is configured to transmit the output image files that are created by the first converting unit.

In accordance with another aspect of the present invention, the data transmission apparatus may also include a second converting unit that is configured to create a single transmission file by converting the plurality of pages of input image data into a single transmission file, and the transmitting unit transmits either the single transmission file created by the second converting unit or the plurality of transmission files created by the first converting unit.

In accordance with another aspect of the present invention, the first and second converting units may convert the input image data into transmission files having a Tag Image File Format (TIFF). Alternatively, the first and second converting units may convert the input image data into transmission files having a Portable Document File (PDF) format.

In accordance with yet another aspect of the present invention, the transmitting unit may transmit the transmission files using an E-mail Protocol. Alternatively, the transmitting unit may transmit the transmission files using a File Transfer Protocol (FTP).

In accordance with a further aspect of the present invention, the designator unit may designate that each page of the input image data obtained by the input unit be converted into a separate transmission file. Alternatively, the designator unit may designate multiple pages to be converted into one or more of the plurality of transmission files.

According to another aspect of the present invention, a data transmission method includes steps of obtaining input image data having a plurality of pages, determining a number of transmission files to create, designating which page or pages of the input image data are to be put into each of the transmission files, creating the transmission files by converting the input image data having the plurality of pages into the plurality of transmission files based on the page designations for each of the transmission files.

According to still another aspect of the present invention, a computer readable program stored in a storage medium includes a method including steps of obtaining input image data having a plurality of pages, designating which page or pages of the input image data are to be put into each of the transmission files based on the page designations for each of the transmission files, and transmitting the transmission files.

The foregoing and other features of the present invention will become more apparent from the following detailed description of the preferred embodiments taken in conjunction with the accompanying drawings.

DESCRIPTION OF THE PREFERRED EMBODIMENTS

Preferred embodiments of the present invention will now be described with reference to the drawings.

First Embodiment

Figure 1:
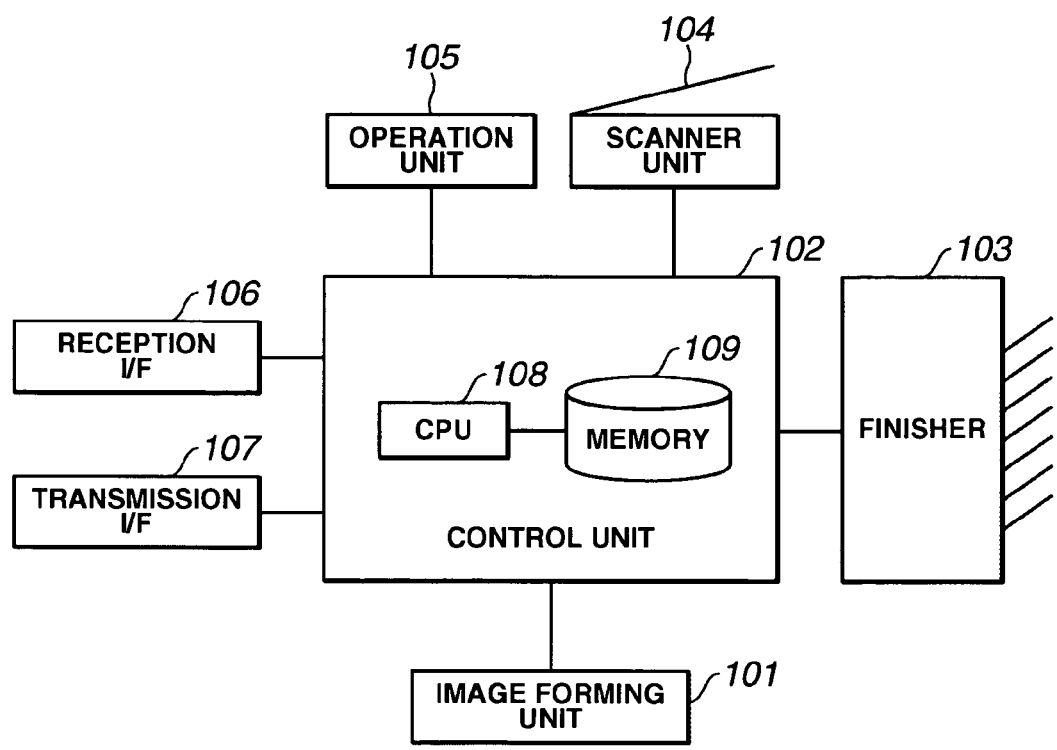
FIG. 1 is a block diagram illustrating the configuration of a digital composite apparatus according to a first embodiment of the present invention.
Figure 2:
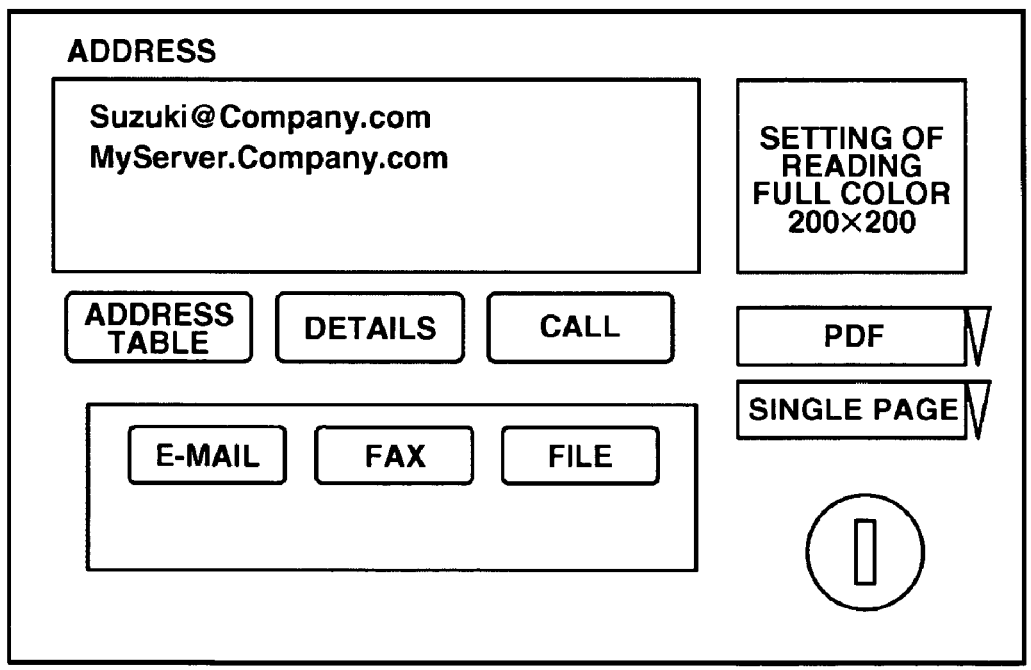
FIG. 2 is a diagram illustrating a dialog displayed on an operation unit 105 shown in FIG. 1.

FIG. 1 is a block diagram illustrating the configuration of a digital composite apparatus according to a first embodiment of the present invention. FIG. 2 is a diagram illustrating a dialog displayed on an operation unit 105 shown in FIG. 1.

The digital composite apparatus of the first embodiment performs a plurality of functions, such as a copying function, a printer function, a data transmission/reception function (including a facsimile function and an electronic-mail (E-mail) function), and the like. As shown in FIG. 1, the digital composite apparatus includes a control unit 102 to which an image forming unit 101, a finisher unit 103, a scanner unit 104, an operation unit 105, a reception interface (hereinafter abbreviated as a "reception I/F") 106, and a transmission interface (hereinafter abbreviated as a "transmission I/F") are connected via corresponding interfaces. Various embodiments may also include other device or interfaces. For example, some embodiments may include a card reader.

The reception I/F 106 and the transmission I/F 107 correspond to a plurality of data transmission/reception functions, such as a facsimile function (a known G3 and/or G4 method), an electronic-mail function (a known SMTP (simple mail transfer protocol)/POP (post office protocol) method), a file transfer function (a known FTP (file transfer protocol) method), and the like, and include a plurality of reception I/Fs and transmission I/Fs, respectively, so as to correspond to the respective functions.

The control unit 102 includes a CPU (central processing unit) 108 and a memory 109. The CPU 108 controls the above-described blocks in accordance with programs stored in the memory 109, and executes various types of processing.

Input image data having a plurality of pages may be obtained by reading an original including a plurality of sheets by the scanner unit 104, or from a document including a plurality of pages stored within the memory 109. The programs within the memory 109 include a program for determining which of multiple-page transmission and entire-division transmission is designated as a transmission form when transmitting input image data of a plurality of pages, transmitting, when multiple-page transmission has been designated, the input image data of the plurality of pages as a single file provided with a predetermined format, and dividing, when entire-division transmission has been designated, the image data of the plurality of pages in units of a page and transmitting respective ones of the divided image data as individual files, each provided with a predetermined format.

An input panel for inputting, for example, instructions for performing various settings, and a display panel for displaying each type of setting information, a message and the like are provided on the operation unit 105. Instructions and the like input through the operation unit 105 are input to the CPU 108 of the control unit 102.

In the first embodiment, when transmitting desired image data using the data transmission function, the user instructs reading of an original by the scanner unit 104 or designates a document stored in the memory 109, selects the transmission address, the format, the form of transmission, and the like of the image data during transmission, and requests transmission of the image data, through the operation unit 105. When performing such a request for transmission, for example, a dialog shown in FIG. 2 is displayed on the operation unit 105. In this dialog, the following areas are provided: area for inputting an address (in FIG. 2, a summary of registered addresses, i.e., Suzuki@Company.com, and MyServer.Company.com (addresses for E-mail), are selectably displayed), an area for selecting the type of data transmission (electronic mail (E-mail), facsimile transmission (Fax), or file transfer (File)), an area for setting reading during reading of an original by the scanner unit 104 (color/monochrome, resolution), an area for selecting the form of a file during data transmission (PDF or TIFF), an area for selecting the type of transmission (multiple-page transmission or entire-division transmission (Single Page)), and the like are displayed, and information corresponding to each of the input areas is input by the user. When such information has been input, a request for transmission including such information is input from the operation unit 105 to the control unit 102.

Figure 3:
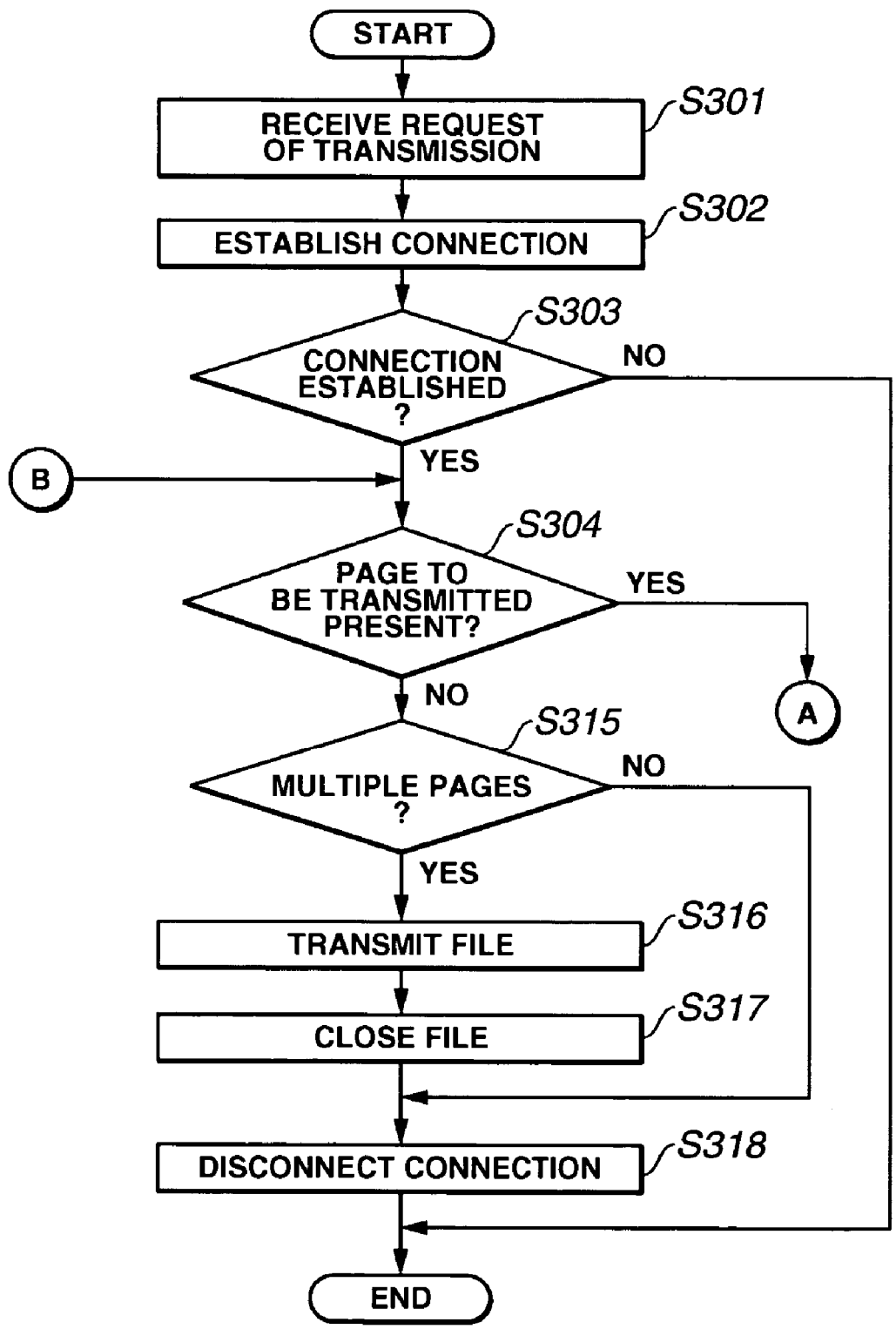
FIGS. 3 and 4 are flowcharts illustrating a processing procedure of a data transmission function in the digital composite apparatus shown in FIG. 1.
Figure 4:
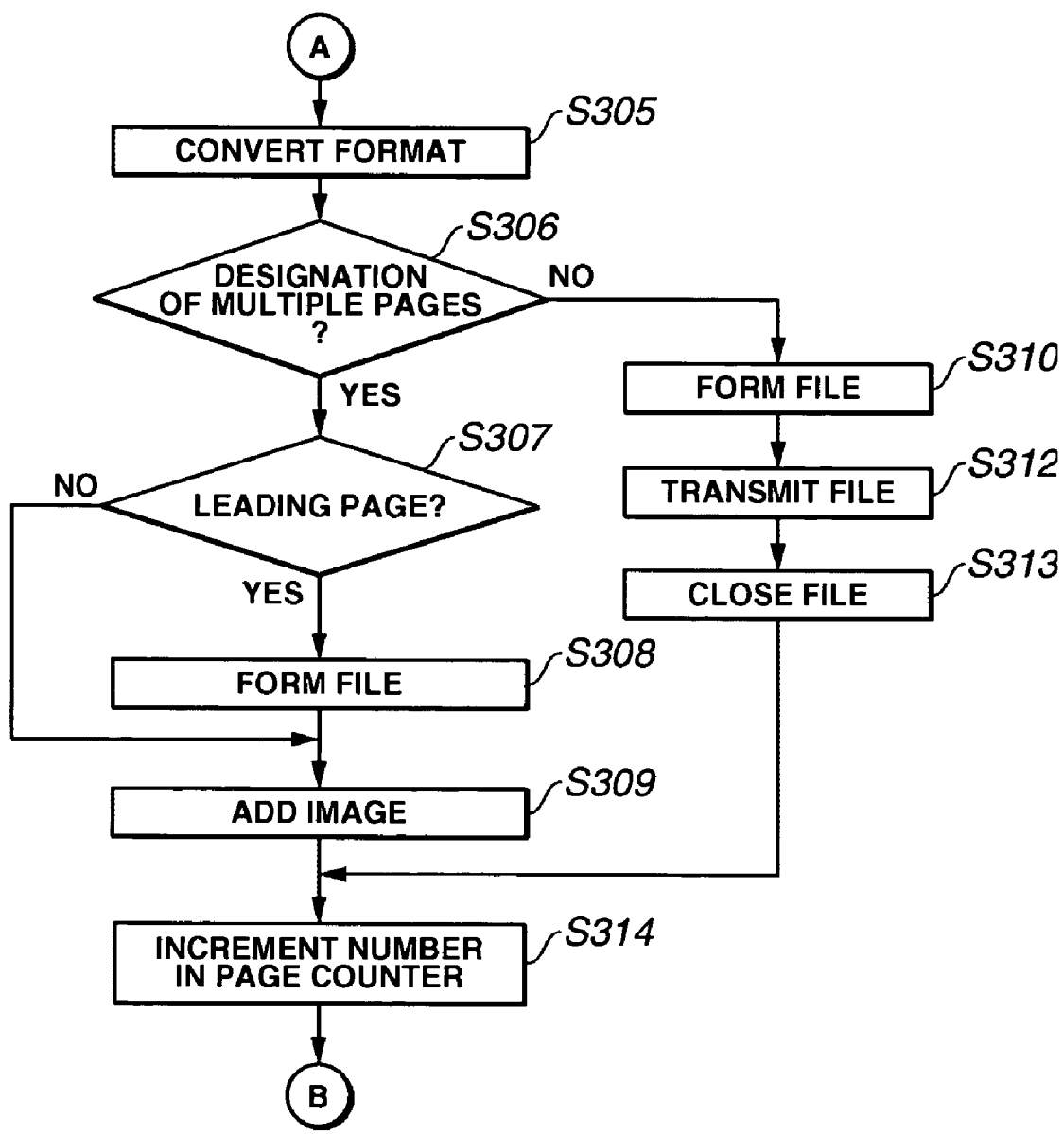

Next, the processing of a data transmission function in accordance with the first embodiment will be described with reference to FIGS. 3 and 4. FIGS. 3 and 4 are flowcharts illustrating the procedure of processing of the data transmission function in the digital composite apparatus shown in FIG. 1. This procedure is executed by the CPU 108 of the control unit 102 in accordance with a program stored in the memory 109. In this description, data transmission by the above-described data transmission function can be data transmission via electronic mail (E-mail), via facsimile (Fax) or via a file transfer (File).

As shown in FIG. 3, the CPU 108 receives a request for transmission that has been input by the user through the operation unit 105 (step S301). This request for transmission includes the name of image data to be transmitted (the name of an original to be read that has been set in the scanner unit 104, a document within the memory 109 that has been designated through the operation unit 105, or the like), the name of a transmission address that has been input through the operation unit 105, the designated file format, the designated form of transmission (E-mail, Fax, File), and the like. Based on the received request for transmission, the CPU 108 executes processing for establishing a communication connection with the communication partner via the transmission I/F 107 (step S302). In the case of E-mail transmission, the transmission partner is sometimes a mail server.

Then, the CPU 108 determines whether or not the establishment of the connection has succeeded (step S303). If the result of the determination in step S303 is negative, the CPU 108 terminates the processing assuming a communication error. If the result of the determination in step S303 is affirmative, then, the CPU 108 determines whether or not a page to be transmitted (for which conversion into a transmission file is not yet completed) based on the received request for transmission is present (step S304).

If the result of the determination in step S304 is affirmative, then, as shown in FIG. 4, the CPU 108 converts data of the page to be transmitted into image data of the designated file format (step S305). Then, the CPU 108 determines whether or not the designated transmission form is a multiple-page transmission in which data of all pages is transmitted as one file (step S306). If the result of the determination in step S306 is affirmative, then, the CPU 108 determines whether or not the current page is the leading page of the designated data (step S307).

If the result of the determination in step S307 is affirmative, the CPU 108 forms a transmission file (step S308), and stores the image data converted in the format designated in the above-described step S305 into the formed transmission file (step S309). Then, the CPU 108 increments the number in a page counter within the memory 109 (step S314), and returns the processing to the above-described step S304.

If the result of the determination in step S307 is negative, the CPU 108 skips the above-described step S308, and stores the image data converted in the format designated in the above-described step S305 into the transmission file (step S309). That is, in step S309, image data of pages after the leading page is stored in the transmission file where the image data of the leading page has already been stored.

When multiple-page transmission is designated, and it is determined that there is no page to be transmitted because data of all pages has been converted into image data of the designated format (step S304), the CPU determines whether or not multiple-page transmission is designated (step S315). Since multiple-page transmission has been designated, the CPU 108 transmits a file including image data of all pages to the communication partner (step S316), and closes the file (step S317). At that time, in the case of E-mail transmission, one E-mail message is transmitted by making a file including all pages as an additional file. Then, the CPU 108 disconnects the connection established with the communication partner (step S318), and terminates the processing.

If the result of the determination in step S306 is negative, i.e., when the designated form of transmission is divided transmission in which one page is transmitted as one file (single-page designation), the CPU 108 forms a transmission file including the image data converted in the format designated in the above-described step S305 (step S310). That is, one file including an image for one page is formed. Then, the CPU 108 transmits the formed transmission file to the communication partner (step S312), and closes the file (step S313).

Then, the CPU 108 increments the number in the page counter within the memory 109 (step S314), and returns the process to the above-described step S304. When entire-division transmission is designated, and it is determined that there is no page to be transmitted because all pages have been transmitted (step S304), the CPU 108 determines whether or not multiple-page transmission is designated. Since multiple-page transmission is not designated in this case, the CPU 108 disconnects the connection established with the communication partner (step S318), and terminates the processing.

In the case of single-page designation, in order to allow discrimination of the order of files, it is desirable to add a serial number to a file. Particularly in the case of E-mail, for example, it is desirable to add a serial number to a subject.

In the case of single-page designation and E-mail transmission, one E-mail message where a plurality of files for all pages are added may be transmitted. In this case, the user designates through the operation unit 105 whether the E-mail message includes one file or a plurality of files.

As described above, in the first embodiment, when transmitting input image data of a plurality of pages (image data of a plurality of pages obtained by reading an original having a plurality of sheets by the scanner unit 104, or a document having a plurality of pages stored within the memory 109), and entire-division transmission is designated, the input image data of the plurality of pages is divided in units of a page, and each divided image data is transmitted as an individual file provided with a predetermined format. Hence, it is possible to transmit image data of a plurality of pages in accordance with the user's intention, and simplify an operation when transmitting image data of a plurality of pages to the same address as individual files.

Second Embodiment

Figure 5:
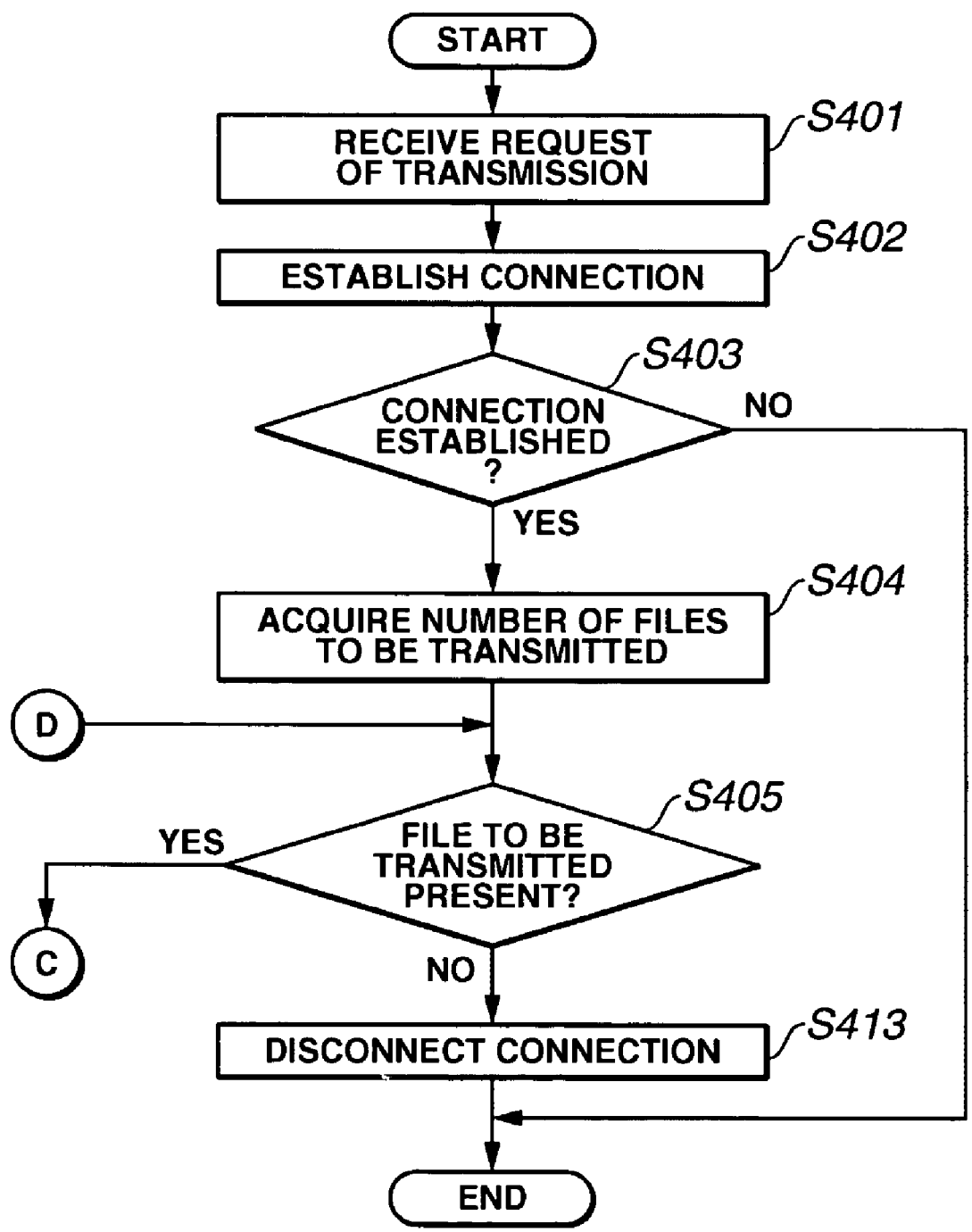
FIGS. 5 and 6 are flowcharts illustrating a processing procedure of a data transmission function in a digital composite apparatus according to a second embodiment of the present invention.
Figure 6:
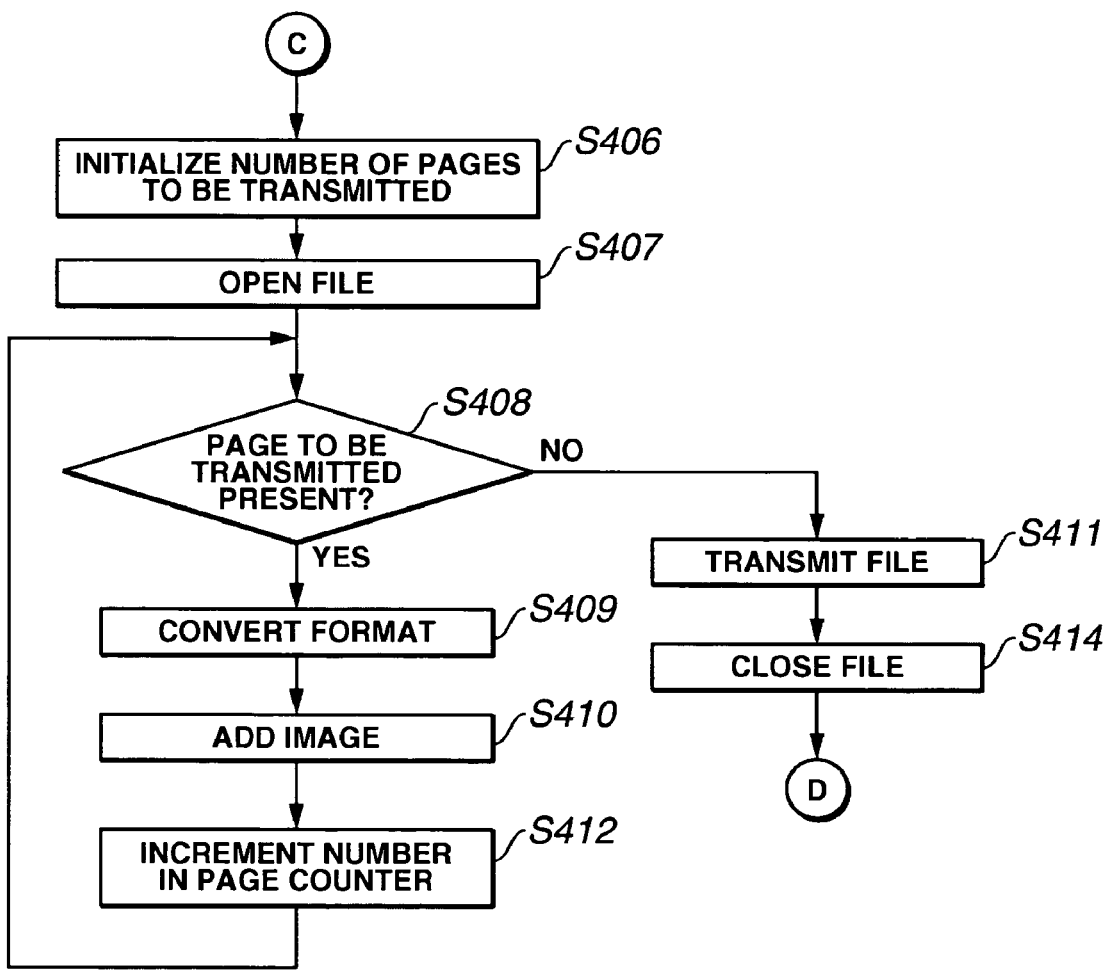
Figure 7:
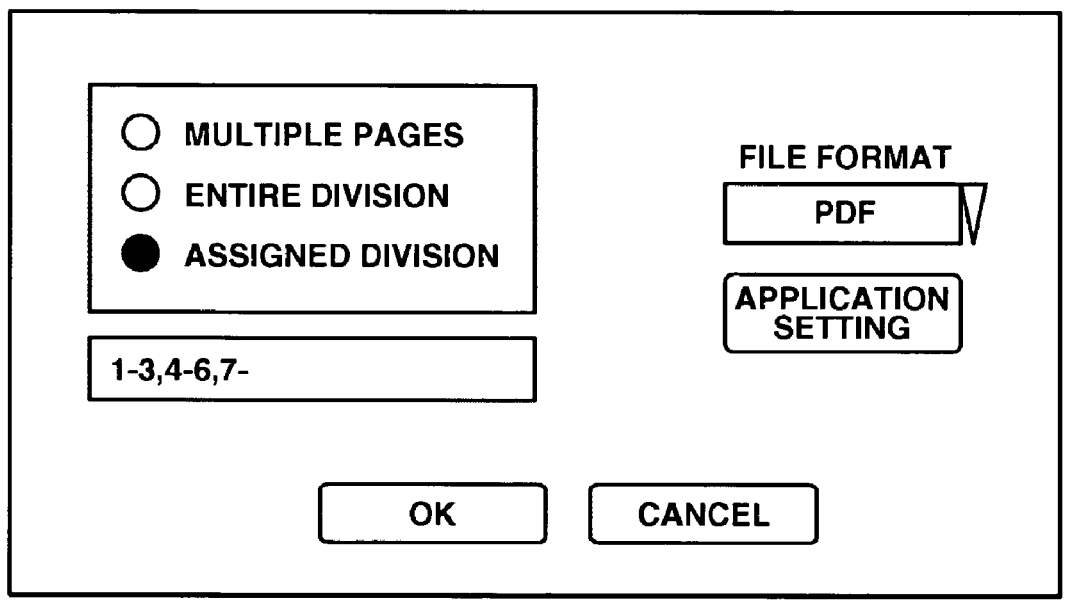
FIG. 7 is a diagram illustrating a dialog for instructing page division in the digital composite apparatus according to the second embodiment.

Next, a second embodiment of the present invention will be described with reference to FIGS. 5-7. FIGS. 5 and 6 are flowcharts illustrating the procedure of processing of a data transmission function in a digital composite apparatus according to the second embodiment. FIG. 7 is a dialog for specifying page division in the digital composite apparatus of the second embodiment.

The digital composite apparatus of the second embodiment has the same configuration as in the first embodiment, and further description thereof will be omitted.

In the first embodiment, when transmitting designated data by dividing the data, the data is divided in units of a page, and one page is transmitted as one file. In the second embodiment, however, a unit of division when transmitting designated data by diving the data can be designated. For example, it is desirable to use an arbitrary number of pages as a unit of division.

More specifically, when the user performs a request for transmission in order to transmit a document, for example, a dialog shown in FIG. 7 is displayed on the operation unit 105. This dialog is for selecting a transmission form and a file format during transmission, and is displayed, for example, after original input settings (color/monochrome, resolution), a transmission address and a transmission method (E-mail, Fax, File) have been input. In the second embodiment, it is possible to select one of multiple-page transmission, entire-division transmission, and assigned-division (also referred to herein as a designated-division) transmission as the transmission form. As in the first embodiment, transmission-file formats that can be designated include the TIFF, the PDF, and the like.

As described above, in multiple-page transmission, all pages of transmission data are converted into image data of a designated format, and one file including image data of all of the pages is formed and transmitted. In entire-division transmission (single-page transmission), transmission data is converted into image data of a designated format for each page, and an individual file is formed and transmitted for image data for each page. Designated-division transmission is a transmission form peculiar to the second embodiment, in which transmission data is divided into a plurality of page groups (which may include groups of only one page) in designated units of division. Data of pages of each of the page groups is converted into image data of a designated format, and one file is formed and transmitted for each of the page groups. In the case of designated-division transmission, for example, as shown in FIG. 7, if units of division are designated as 1-3, 4-6, and 7-9 for data of nine pages, a file including images of pages 1-3, a file including images of pages 4-6, and a file including images of pages 7-9 are formed, and each of the files is transmitted to the same address. As shown in the example dialog of FIG. 9, if a group includes pages leading up to the last page and the last age, the last page number need not be entered. For example, as shown in FIG. 7, if the original includes nine pages and the last group includes pages 7-9, "7-" is equivalent to "7-9". Furthermore, it will be appreciated that the groups can be of varying sizes. For example, a designated division for a nine page file could be "1, 2-3, 7-". Such a designation would create three transmission files of varying sizes: a first transmission file including one page of image data for page 1 of the input image data, a second transmission file including two pages of image data for input image data for pages 2-3 and a third transmission file including three pages of image data for input image data for pages 7-9. It will be noted that not all pages need be included in the transmission files. In the example just described, pages 4-6 of the input image file will not be transmitted.

Next, the processing of a data transmission function in the second embodiment will be described with reference to FIGS. 5 and 6. The procedure shown in FIGS. 5 and 6 is executed by the CPU 108 of the control unit 102 in accordance with a program stored in the memory 109.

As shown in FIG. 5, the CPU 108 receives a request for transmission that has been input by the user through the operation unit 105 (step S401). This request for transmission includes the name of image data to be transmitted (the name of an original to be read that has been set in the scanner unit 104, a document within the memory 109 that has been designated through the operation unit 105, or the like), the name of a transmission address that has been input through the operation unit 105, the designated file format, the designated form of transmission, and the like. Based on the received request for transmission, the CPU 108 executes processing for establishing communication connection with the communication partner via the transmission I/F 107 (step S402). In the case of E-mail transmission, the communication partner is sometimes a mail server).

Then, the CPU 108 determines whether or not the establishment of the connection has succeeded (step S403). If the result of the determination in step S403 is negative, the CPU 108 terminates the processing assuming a communication error. If the result of the determination in step S403 is affirmative, the CPU 108 acquires the number of transmission files based on the received request for transmission (step S404). That is, in this step, the number of files to be transmitted is acquired in accordance with the transmission form. For example, when multiple-page transmission is designated, the number of files to be transmitted is one. When entire-division transmission is designated, the number of files to be transmitted corresponds to the number of pages of a document or an original to be transmitted. When assigned-division transmission is designated, the number of files to be transmitted corresponds to the number of divided portions when a document of an original to be transmitted is divided in designated units of division. For example, in the example shown in FIG. 7, the number of transmission files to be transmitted is three: a first transmission file for pages 1-3, a second transmission file for pages 4-6, and a third transmission file for pages 7-9. Then, the CPU 108 determines whether or not a file to be transmitted is present based on the acquired number of files to be transmitted (step S405).

If the result of the determination in step S405 is affirmative, then, as shown in FIG. 6, the CPU 108 initializes the number of pages to be transmitted within the memory 109 (step S406), and opens, i.e., forms, a file (step S407). Then, the CPU 108 determines whether or not a page to be transmitted (a page for which conversion into a transmission file is not yet completed) is present within the designated data (step S408). If the result of the determination in step S408 is affirmative, the CPU 108 converts data to be transmitted into image data of the designated file format (step S409). Then, the CPU 108 stores the image data converted into the format designated in the above-described step S409 into the transmission file opened in the above-described step S407 (step S410).

Then, the CPU 108 increments the number in the page counter within the memory 109 (step S412), and returns the processing to the above described step S408.

If the result of the determination in step S408 is negative, the CPU 108 transmits a file where image data of pages corresponding to the transmission form is stored (step S411), and closes the file (step S414). Then, the CPU 108 returns the processing to the above-described step S405.

If the result of the determination in step S405 is negative, it indicates that transmission of the document or the original has been completed. Hence, the CPU 108 disconnects the connection established with the communication partner (step S413), and terminates the processing.

When a multiple-pages transmission is designated in the above-described procedure, a number of a file to be transmitted of "1" is acquired (step S404), one file is formed (step S407), data of all pages is converted into image data of the designated format and the obtained image data is stored in one file (steps S408, S409, S410, and S412), and one file including image data of all pages is transmitted and the connection is disconnected (steps S411, S414, S405 and S413).

In the case of entire-division transmission, the number of files corresponding to the number of pages is acquired as the number of files to be transmitted (step S404). For example, if data includes 10 pages, "10" is acquired as the number of files. Formation of one file (step S407), conversion of data for one page into image data and storage of the image data in the file (steps S408, S409, S410 and S412), and transmission of the file (steps S411, S414 and S405) are repeated for the number of pages. After the last transmission file is transmitted, the connection is disconnected (step S413).

In the case of designated-division transmission, the number of files corresponding to the number of pages is acquired as the number of file groups to be transmitted (step S404). For example, if data includes 9 pages, and the unit of division is 3 pages, "3" is acquired as the number of files since data of 9 pages is divided into three page groups. As mentioned above, there need not be a single unit of division. That is, the number of pages may vary per division. Formation of one file (step S407), conversion of divided page groups into image data and storage of the image data in the file (steps S408, S409, S410 and S412), and transmission of the file (steps S411, S414 and S405) are repeated for the number of page groups. After the last transmission file is transmitted, the connection is disconnected (step S413).

In the second embodiment, also, in the case of E-mail transmission, transmission is performed in the form of adding the formed file. When passing through a mail server, data obtained by adding the E-mail address of the communication partner to "To field" is transmitted to the mail server (SMTP server) so that the data is finally transmitted to the E-mail address. When directly transmitting data to the communication partner, the data is transmitted by acquiring information relating to a terminal corresponding to a DNS (domain name system) server.

In the case of entire-division transmission or designated-division transmission, instead of providing one file for one E-mail message as described in the first embodiment, a plurality of files may be added to one E-mail message.

Alternatively, a different file type may be provided for each file. In this case, a file format for each file is set through the operation unit 105.

In the case of designated-division transmission, instead of transmitting the entire original, a file may be formed by skipping unnecessary pages. For example, the designated division may be specified as 1-3, 7-9 to send the first three pages and the last three pages of a nine page image.

As described above, in the second embodiment, it is possible to divide image data of a plurality of pages in units of an arbitrary number of pages, and transmit resultant data.

The objects of the present invention may, of course, also be achieved by supplying a system or an apparatus with a storage medium (or a recording medium) storing program code (software) for realizing the functions of the above-described embodiments, and reading and executing the program code stored in the storage medium by means of a computer (or a CPU or an MPU (microprocessor unit)) of the system or the apparatus. In such a case, the program code read from the storage medium realizes the functions of the above-described embodiments, so that the storage medium storing the program codes constitutes the present invention. The present invention may, of course, be applied not only to a case in which the functions of the above-described embodiments are realized by executing program codes read by a computer, but also to a case in which an operating system (OS), or the like, operating in a computer executes a part or the entirety of actual processing, and the functions of the above-described embodiments are realized by the processing.

The present invention may, of course, be applied to a case in which, after writing program codes read from a storage medium into a memory provided in a function expanding card inserted into a computer or in a function expanding unit connected to the computer, a CPU or the like provided in the function expanding card or the function expanding unit performs a part or the entirety of actual processing, and the functions of the above-described embodiments are realized by the processing.

The individual components designated by blocks in the drawings are all well known in the data transmission apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data transmission apparatus comprising:
an input unit configured to obtain a set of input image data having a plurality of pages;
a first converting unit configured to create a plurality of transmission files by converting the set of input image data having the plurality of pages into the plurality of transmission files;
a second converting unit configured to create a single transmission file by converting the input image data having the plurality of pages into a single transmission file;
a designating unit configured to designate, by a user input, a plurality of points of the set of input image data for division of the set of input image data to be put into each transmission file to be created by said first converting unit; and
a transmitting unit configured to transmit the input image data obtained by said input unit as the plurality of the transmission files created by said first converting unit or the single transmission file created by said second converting unit,
wherein the first converting unit is configured to convert the set of input image data into the plurality of transmission files in accordance with the points designated by the designating unit and at least one of the transmission files converted by the converting unit has the plurality of pages.

2. The data transmission apparatus according to claim 1, wherein said second converting unit converts the input image data into a Tag Image File Format.

3. The data transmission apparatus according to claim 1, wherein said second converting unit converts the input image data into a Portable Document Format file.

4. The data transmission apparatus according to claim 1, wherein said first converting unit converts the input image data into a Tag Image File Format.

5. The data transmission apparatus according to claim 1, wherein said first converting unit converts the input image data into a Portable Document Format file.

6. The data transmission apparatus according to claim 1, wherein said transmitting unit transmits the transmission files using an E-mail protocol.

7. The data transmission apparatus according to claim 1, wherein said transmitting unit transmits the transmission files using a File Transfer Protocol.

8. The data transmission apparatus according to claim 1, wherein a subset of pages of the input image data is designated to be put into the transmission files.

9. A data transmission method comprising:
obtaining a set of input image data having a plurality of pages;
determining a number of transmission files in which to transmit the plurality of pages of the set of input image data;
designating, based on user input, a plurality of points of the set of input image data for a of the set of input image data to be put into each of the transmission files, said designating creating a page designation for each of the transmission files;
creating a plurality of transmission files by converting the set of input image data having the plurality of pages into the plurality of transmission files according to the page designation for each of the transmission files or creating a single a transmission file by converting the input image data having the plurality of pages into a single transmission file; and
transmitting the plurality of transmission files or the single transmission file,
wherein the set of input image data is converted into the plurality of transmission files in accordance with the points designated and at least one of the transmission files has the plurality of pages.

10. The data transmission method according to claim 9, wherein said creating the transmission files comprises creating the transmission files by converting the input image data having the plurality of pages into the plurality of transmission files in a Tag Image File Format according to the page designation.

11. The data transmission method according to claim 9, wherein said creating the transmission files comprises creating the transmission files by converting the input image data having the plurality of pages into the plurality of transmission files in a Portable Document Format according to the page designation.

12. The data transmission method according to claim 9, wherein said transmitting the transmission files comprises transmitting the transmission files using an E-mail protocol.

13. The data transmission method according to claim 9, wherein said transmitting the transmission files comprises transmitting the transmission files using a File Transfer Protocol.

14. A computer readable program, stored in a storage medium, said program comprising instructions for performing a method comprising:

obtaining a set of input image data having a plurality of pages;

determining a number of transmission files in which to transmit the plurality of pages of the set of input image data;

designating, based on user input, a plurality of points of the set of input image data for a division of the set of input image data to be put into each of the transmission files, said designating creating a page designation for each of the transmission files;

creating a plurality of transmission files by converting the set of input image data having the plurality of pages into the plurality of transmission files according to the page designation for each of the transmission files or creating a single a transmission file by converting the input image data having the plurality of pages into a single transmission file; and transmitting the plurality of transmission files or the single transmission file, wherein the set of input image data is converted into the plurality of transmission files in accordance with the points designated and at least one of the transmission files has the plurality of pages.

* * * * *